United States Patent
Lee et al.

(10) Patent No.: US 7,257,861 B2
(45) Date of Patent: Aug. 21, 2007

(54) HINGE STRUCTURE OF FLAT VISUAL DISPLAY DEVICE

(75) Inventors: Gang Hoon Lee, Gumi-si (KR); Hong Ki Kim, Deagu-si (KR)

(73) Assignee: LG Electronics Inc., Seoul (KR)

(*) Notice: Subject to any disclaimer, the term of this patent is extended or adjusted under 35 U.S.C. 154(b) by 167 days.

(21) Appl. No.: 10/499,982

(22) PCT Filed: Jul. 27, 2002

(86) PCT No.: PCT/KR02/01432

§ 371 (c)(1),
(2), (4) Date: Nov. 29, 2004

(87) PCT Pub. No.: WO03/056412

PCT Pub. Date: Jul. 10, 2003

(65) Prior Publication Data

US 2005/0108854 A1 May 26, 2005

(30) Foreign Application Priority Data

Dec. 27, 2001 (KR) ................. 2001-85860

(51) Int. Cl.
*E05C 17/64* (2006.01)
*E05D 11/08* (2006.01)
(52) U.S. Cl. .......................... 16/338; 16/340
(58) Field of Classification Search .......... 16/338, 16/339, 346, 337, 307, 308; 361/680, 681, 361/682, 683; 455/575.1, 575.4, 575.8, 550.1, 455/90.3; 248/919–923; 348/373, 333.06; 403/119, 120
See application file for complete search history.

(56) References Cited

U.S. PATENT DOCUMENTS

| | | | | |
|---|---|---|---|---|
| 1,768,810 A * | 7/1930 | Walton | .......................... | 16/340 |
| 1,967,104 A * | 7/1934 | Sorrow, Jr. | .................... | 4/236 |
| 5,075,929 A * | 12/1991 | Chung | .......................... | 16/342 |
| 5,208,944 A | 5/1993 | Lu et al. | | |
| 5,473,794 A * | 12/1995 | Kobayashi | .................... | 16/337 |
| 5,652,694 A * | 7/1997 | Martin | ....................... | 361/681 |
| 5,702,197 A | 12/1997 | Chen et al. | | |
| 5,970,819 A * | 10/1999 | Katoh | .......................... | 74/531 |
| 6,018,847 A * | 2/2000 | Lu | .............................. | 16/337 |
| 6,145,797 A * | 11/2000 | Uehara | .................... | 248/291.1 |

(Continued)

FOREIGN PATENT DOCUMENTS

| | | | |
|---|---|---|---|
| DE | 4212181 A1 * | 10/1993 | |
| FR | 2721973 A1 * | 1/1996 | |
| GB | 2203484 A * | 10/1988 | |
| JP | 57092352 A * | 6/1982 | |

(Continued)

*Primary Examiner*—Chuck Y. Mah
(74) *Attorney, Agent, or Firm*—Birch, Stewart, Kolasch & Birch, LLP

(57) ABSTRACT

Disclosed is a hinge structure comprising: a fixed plate; pivotal plates provided outside both side planes of the fixed plate for relatively pivoting in respect to the fixed plate; a hinge shaft inserted into the fixed plate and the pivotal plates for functioning as a central pivoting shaft and provided in one end with a head portion expanded beyond the diameter of the hinge shaft and in the other end with a coupling portion; a fixing member fitted around the other end of the hinge shaft and laterally movable for adjusting the degree of tightening the hinge shaft; and projected washers each integrally bulged from inner faces of the pivotal plates for forming frictional faces against the fixed plate.

18 Claims, 4 Drawing Sheets

U.S. PATENT DOCUMENTS

| | | |
|---|---|---|
| 6,154,925 A | 12/2000 | Miura et al. |
| 6,666,422 B1 * | 12/2003 | Lu et al. .................. 248/291.1 |
| 6,698,063 B2 * | 3/2004 | Kim et al. .................... 16/337 |
| 2001/0052167 A1 * | 12/2001 | Cho ............................. 16/337 |
| 2003/0046791 A1 * | 3/2003 | Choi ............................ 16/337 |
| 2004/0055114 A1 * | 3/2004 | Lu ............................... 16/340 |

FOREIGN PATENT DOCUMENTS

| | | | |
|---|---|---|---|
| JP | 11303492 A | * | 11/1999 |
| JP | 2000249133 A | * | 9/2000 |
| KR | 10-2000-0025108 A | | 6/2000 |
| WO | WO 3067406 A1 | * | 8/2003 |

* cited by examiner

HINGE STRUCTURE OF FLAT VISUAL DISPLAY DEVICE

TECHNICAL FIELD

The present invention relates to a hinge structure, and more particularly, to a hinge structure for a flat visual display device which is applicable as a shaft between both members for performing relative pivoting movement so as to ensure smooth movement between the both members.

BACKGROUND ART

As well known in the art, a number of hinge structures are applied to move a pivoting member vertically or laterally in respect to a fixed member about one rotation shaft. More specifically describing an operation of an article to which the hinge structure is applied by way of illustration, this operation may include certain operations such as opening/closing of an article cover, opening/closing of an upper portion of a notebook computer and vertical adjustment of a visual display device.

The hinge structure generally has a frictional member for applying a certain amount of frictional force and an elastic member for supporting the weight of a pivotal member.

In the meantime, examples of conventional hinge structures include those as proposed in Korean Laid-Open Utility Model Registration No. 20200110000941 and Korean Laid-Open Utility Model Registration No. 20200110000942.

However, the conventionally proposed hinge structures have an inconvenience in that a rotation shaft to be inserted into a central axis of a hinge is necessarily cut into a certain shape of flat plate.

Further, the rotation shaft is fastened in its both ends with certain structures of washer and nut so as to support both sides of the rotation shaft with independent forces. This causes different frictional forces to be applied to the both sides of the rotation shaft thereby failing to apply the frictional force to the both sides of the rotation shaft as a balanced braking force. Then, a user may not easily move the pivotal member as a drawback.

Moreover, the conventional structure has a problem that a number of washers are applied to unnecessarily add more processes in manufacture of an article.

The present invention has been made to solve the above problem of the related art and it is therefore an object of the invention to provide a hinge structure by which a force applied to both ends of a rotation shaft can be equally divided in an easy manner.

It is another object of the invention to provide a hinge structure which can reduce the number of washers provided in faces between a fixed member and pivotal members so as to overcome the difficulty in manufacturing processes.

It is further another object of the invention to provide a hinge structure which can provide a generally circularly-configured rotation shaft and reduce the number of washers so as to shorten the time consumed for manufacturing an article.

DISCLOSURE OF THE INVENTION

According to an aspect of the invention to obtain the above objects of the invention, it is provided a hinge structure comprising: a fixed plate; pivotal plates provided outside both side planes of the fixed plate for relatively pivoting in respect to the fixed plate; a hinge shaft inserted into the fixed plate and the pivotal plates for functioning as a central pivoting shaft and provided in one end with a head portion expanded beyond the diameter of the hinge shaft and in the other end with a coupling portion; a fixing member fitted around the other end of the hinge shaft and laterally movable for adjusting the degree of tightening the hinge shaft; and projected washers each integrally bulged from inner faces of the pivotal plates for forming frictional faces against the fixed plate.

As proposed above, the hinge structure for a flat visual display device of the invention provides the circular hinge shaft capable of exerting the same amount of tightening force even though tightening operation is carried out in respect to only one side so that the movement of the hinge structure can be more smoothly adjusted. The frictional faces are bulged between the fixed member and the pivotal members so as to reduce the number of components and manufacturing processes consumed for the manufacture of the hinge shaft.

BEST MODE FOR CARRYING OUT THE INVENTION

The following detailed description will present a preferred embodiment of the invention in reference to the accompanying drawings by way of examples.

Figure 1:
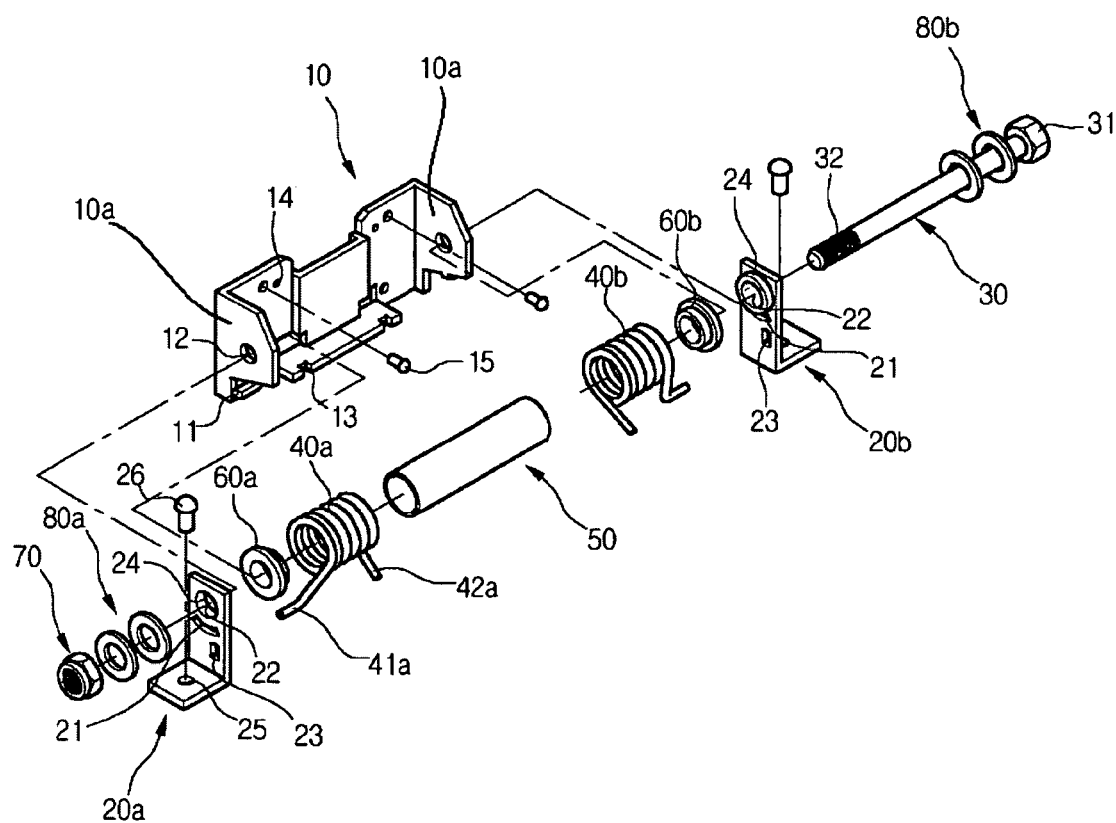
FIG. 1 is an exploded perspective view of a hinge structure for a flat visual display device of the invention.

FIG. 1 is an exploded perspective view of a hinge structure for a flat visual display device of the invention.

Referring to FIG. 1, the hinge structure represented in the invention generally comprises the first and second pivotal plates 20a and 20b freely movable along one axis such as a vertical or lateral axis, a fixed plate 10 relatively fixed in respect to the pivotal plates 20a and 20b, a hinge shaft 30 inserted into and tightened in the fixed plate 10 and the pivotal plates 20a and 20b for imparting hinge operation between the plate 10 and the pivotal plates 20a and 20b, the first and second elastic members 40a and 40b for supporting the weight of a massive object such as a flat visual display device when the fixed plate 10 is installed in the object, sliding members for dispersing frictional force in contact faces between the fixed plate 10 and the elastic members 40a and 40b so that the movement of the fixed plate 10 can be smoothly supported; a spacer 50 provided inside the elastic members 40a and 40b for imparting smooth torsion to the elastic members 40a and 40b and contacting by both ends with the sliding members 60a and 60b for outwardly supporting the positions of the sliding members 60a and 60b at both sides and a fixing member 70 fitted around the tip of the hinge shaft 30 for tightening the hinge shaft 30 to adjust the frictional force in frictional faces.

The pivotal plates 20a and 20b, the elastic members 40a and 40b and the sliding members 60a and 60b each are provided in a pair at both sides to identically support both ends of the fixed plate 10.

Further, both lateral portions of the fixed plate 10 are formed into a symmetric configuration of identical fictional planes allowing the same force to be applied to the both ends so that balanced operation can be ensured to an object to which the fixed plate 10 is mounted.

Describing the construction of the fixed plate 10 in more detail, the fixed plate 10 is symmetrically provided with fitting protrusions 11 for restricting the pivoting angle of the fixed plate 10, the first insertion holes 12 for insertionally receiving the hinge shaft 30 and fitting portions 13 for catching one ends of the elastic members 40a and 40b to elastically support the elastic members 40a and 40b.

In the meantime, the elastic members 40a and 40b are respectively provided in both ends with the first elastic supporting ends 41a and the second elastic supporting ends 42a so as to be caught at the both ends by the fixed plate 10 and the pivotal plates 20a and 20b.

Further, the hinge shaft 30 is provided in one end with a head portion 31 radially expanded beyond the axial diameter so that torque can be applied via a device such as a spanner and in the other end with a fastening portion 32 so that the fixing member 70 can be fitted around the same.

Preferably, the hinge shaft 30 utilizes a general bolt which is commercially available, and the fixing member 70 utilizes a general nut. Further, the fastening portion 32 is provided with threads.

Preferably, the first washers 80a are inserted between the fixing member 70 and the contact face of the first pivotal plate 20a while the second washers 80b are inserted between the head portion 31 and the contact face of the second pivotal plate 20b in order to prevent the inserted hinge shaft 30 from slipping under external impacts and reduce the frictional abrasion thereof. In the meantime, the first and second washers 80a and 80b preferably utilize spring washers so as to more strongly endure any external impacts.

The following description will discuss the operation of the hinge structure in reference to the hinge structure of the invention which was briefly mentioned as above.

The pivotal plates 20a and 20b are mounted to an object such as a flat visual display device, which moves with a proper degree of freedom vertically in respect to the drawing so that the vertical planes of the fixed plate 10 contact with the sliding members 60a and 60b and the pivotal plates 20a and 20b as the frictional faces.

Further, the sliding members 60a and 60b utilize plastic members made of, for example, engineering plastic containing suitable degree of elasticity and plasticity to form the frictional faces smooth. Portions of the pivotal plates 20a and 20b contacting with the fixed plate 10 are bulged from the pivotal plates 20a and 20b to act as certain frictional faces.

Further, the elastic members 40a and 40b are caught at the both ends by the fixed plate 10 and the pivotal plates 20a and 20b so as to support the weight of the flat visual display device.

Hereinafter the construction of the invention will be described more specifically in reference to the above brief introduction.

Figure 2:
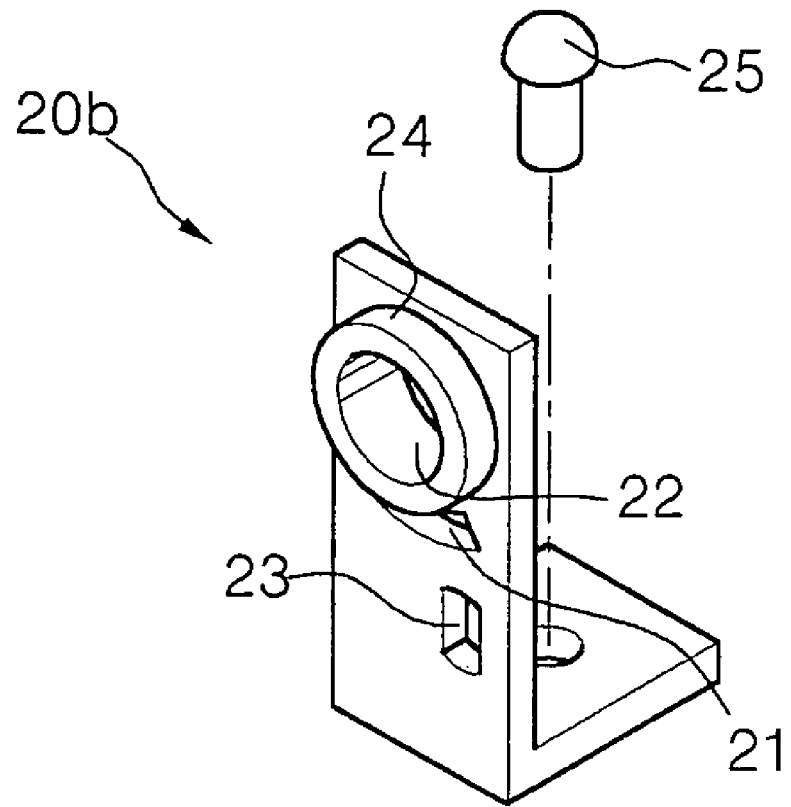
FIG. 2 is a perspective view of a pivotal plate in the hinge structure of the invention.

FIG. 2 is a perspective view of one of the pivotal plates in the hinge structure of the invention.

Referring to FIG. 2, the pivotal plate 20b is provided with a washer 24 integrally bulged therefrom for acting as a frictional face against the fixed plate 10, a protrusion-receiving groove 21 for insertionally receiving the right one of the fitting protrusions (refer to the reference numeral 11 in FIG. 1) in the lateral portion of the fixed plate 10 for allowing adjustment of the operation angle of the pivotal plate 20b and the first fitting portion 23 for insertionally receiving one end of the elastic member 40b to elastically support the same. The pivotal plate 20a has the same configuration as the pivotal plate 20b and thus description thereof will be omitted.

Referring to the above configuration, the operation of the components of the pivotal plates 20a and 20b will be described as follows.

The projected washer 24 is inwardly and integrally bulged from the pivotal plate 20b. Further, a projected face contacts with the outer face on the vertical plane of the fixed plate 10 to form the smooth frictional face so that the pivotal plate 20b contacts with the smooth frictional face when it moves with a proper degree of freedom. The first fitting portion 23 elastically supports the one end of the elastic member 40b so that pivoting the pivotal plate 20b generates a certain amount of restoring force to the elastic member 40b to restore the pivotal plate 20b into the original position thereof. The same operation will take place between the projected washer 24 and the pivotal plate 20a.

Figure 3:
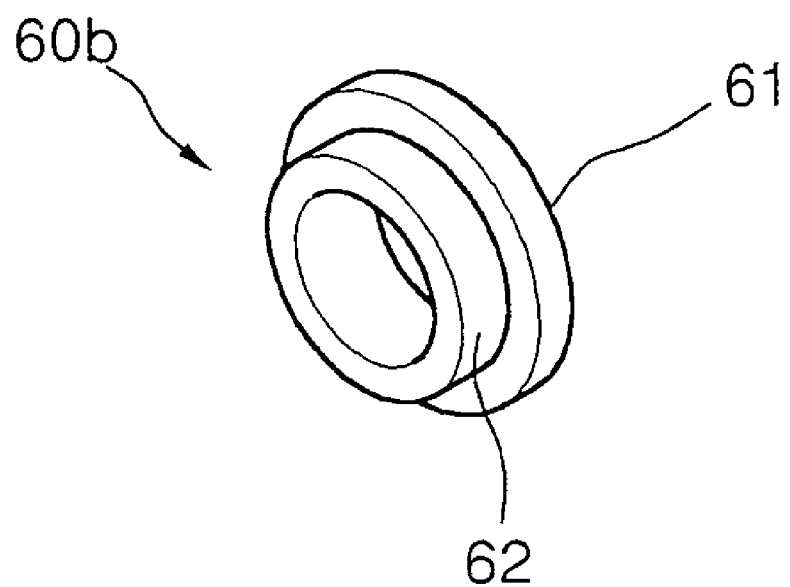
FIG. 3 is a perspective view of a sliding member in the hinge structure of the invention.

FIG. 3 is a perspective view of a sliding member in the hinge structure of the invention.

Referring to FIG. 3, the sliding member 60b has a radially stepped configuration with one end being expanded in diameter beyond the other end.

Describing the configuration of the sliding member 60b more specifically, the sliding member comprises a spacer-supporting portion 62 at one end with a relatively smaller diameter for sliding into the hollow spacer (refer to the reference numeral 50) to stabilize the position of the sliding member 60b and a sliding plane 61 at the other end with a larger diameter than the spacer-supporting portion 62 for defining a frictional face against the fixed plate (refer to the reference numeral 10 in FIG. 1) to act as the frictional face according to the movement of the fixed plate 10. The sliding member 60a has the same configuration as the sliding member 60b.

Figure 4:
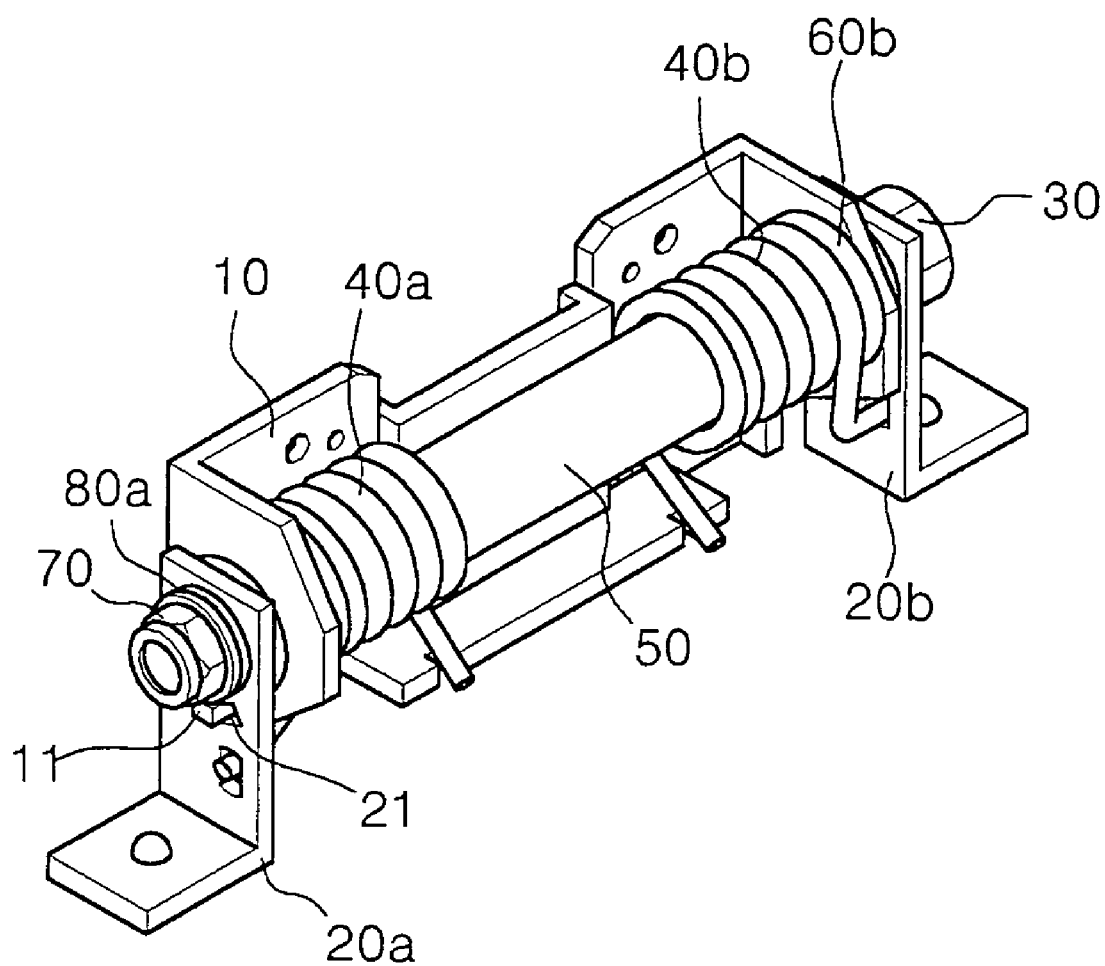
FIG. 4 is a perspective view of the hinge structure for a flat visual display device of the invention.

FIG. 4 is a perspective view of the hinge structure for a flat visual display device of the invention.

Describing the overall operation of the hinge structure of the invention in reference to FIG. 4, the pivotal plates 20a and 20b in the hinge structure of the invention move in the range of the pivoting angle with a proper degree of freedom. However, it should be understood that the pivotal plates 20a and 20b can vertically move in the configuration and position illustrated in the drawing.

As set forth above, although the pivotal plates 20a and 20b vertically move, the fixed plate 10 maintains its fixed position. This naturally forms contact faces between the outer faces of the vertical planes of the fixed plate 10 and the pivotal plates 40a and 40b. The projected washers 24 which are inwardly bulged from the pivotal plates 20a and 20b as set forth above are placed in the contact faces to reduce and equally divide the frictional force.

The sliding members 60a and 60b are interposed between the inner faces of the vertical planes of the fixed plate 10 and the elastic members 40a and 40b to reduce and equally divide the frictional force.

Further, it is required to restrict the degree of vertically pivoting the pivotal plates 20a and 20b so as to avoid damage of an object to which the pivotal plates 20a and 20b are mounted. In order to restrictively adjust the pivoting angle of the pivotal plates 20a and 20b, the fitting protrusions 11 in both sides of the fixed plate 10 are inserted into the arc-shaped protrusion-receiving grooves 21 allowing the pivotal plates 20a and 20b to pivot in a certain range of pivoting angle.

In the meantime, in order to restrain the pivotal plates 20a and 20b from inclining downward owing to the object of a certain weight to which the pivotal plates 20a and 20b are mounted, the elastic members 40a and 40b have a restoring force of pushing the pivotal plates 20a and 20b upward.

In the meantime, it is considered the weight of the object to which the fixed plate is mounted. Where the object has a large weight, the hinge shaft 30 is more strongly tightened to enhance the frictional force applied from the sliding members 60a and 60b and the projected washers 24. On the contrary, where the object has a small weight, it is preferable that the hinge shaft 30 is more weakly tightened to reduce the frictional force applied from said sliding members 60a and 60b and the projected washers 24 so that the flat visual display device is more easily moved.

Further, a suitable amount of oil is dropped over the projected washers 24 so that the projected washers 24 can smoothly move.

In order to adjust the frictional force owing to the tightened degree of the hinge shaft 30, it is required to adjust the tightened degree of the fixing member 70 fitted around the fastening portion 32.

As set forth above, the tightened degree of the hinge shaft 30 can be uniformly obtained at both sides of the hinge shaft 30 by tightening the fixing member 70 only.

That is to say, the fixing member 70 is fitted around the fixing portion 32 in one side of the hinge shaft 30 and fixed under a suitable amount of force so as to exert the same frictional and braking force to the pair pivotal plates 20a and 20b.

Figure 5:
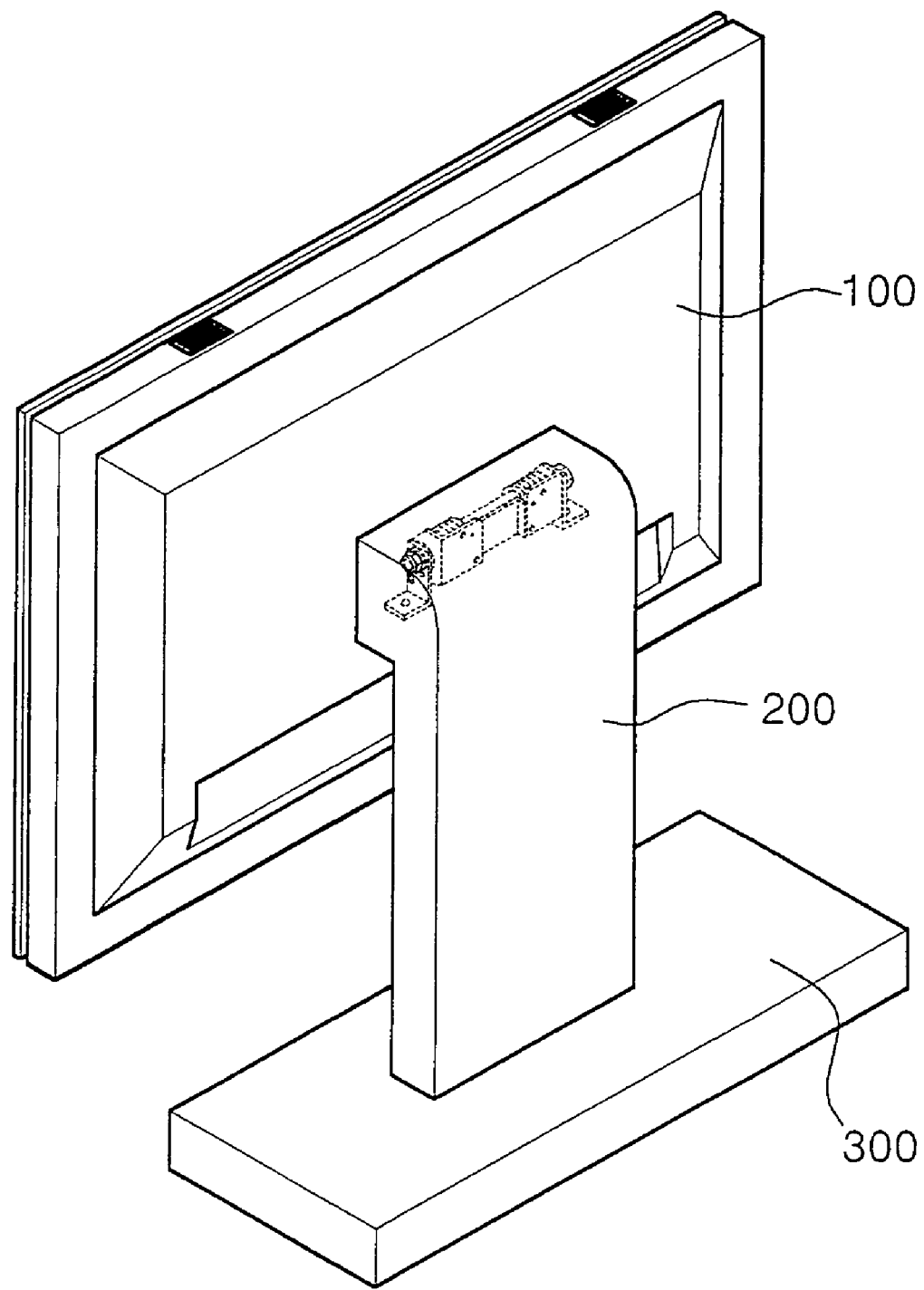
FIG. 5 illustrates the hinge structure for a flat visual display device of the invention in use.

FIG. 5 illustrates the hinge structure for a flat visual display device of the invention in use.

Referring to FIG. 5, a flat visual display device 100 for displaying images is supported by under a supporting portion 200 on a base 300, in which the hinge structure of the invention is installed between the supporting portion 200 and the flat visual display device 100 for adjusting any vertical movement of the flat visual display device 100.

Although the hinge structure of the invention has been disclosed by the way of illustration, it is not intended to be understood that the hinge structure is restrictively applied to the vertical movement only of the flat visual display device as set forth above. It shall be understood that the hinge structure of the invention can be readily applied to and conveniently used in any structures which have a vertical pivoting angle with a certain degree of freedom while having a certain amount of weight.

Further, the present invention is not restricted to the embodiment as set forth above but those skilled in the art will appreciate that addition, omission or modification of the components can readily make other embodiments without departing from the spirit and scope of the invention.

INDUSTRIAL APPLICABILITY

Unlike a conventional hinge structure, the invention is conveniently applied between a pivotal object pivoting in a certain vertical angle and a supporting structure for supporting the object and has the following effects.

First, the invention more conveniently adjusts the magnitude of frictional force which will be applied according to the weight of a pivoting object so as to enhance the convenience of a user. In particular, the frictional and braking force applied to the both pivotal plates can be adjusted through a simple coupling operation between the hinge shaft and the fixing member so that the balanced movement of a pivotal object can be more easily obtained in both of right and left sides.

Further, the projected washers are bulged from the pivotal plates in the structure having the frictional faces between the pivotal plates mounted to the pivotal object and the fixed plates fastened to the supporting portion so as to reduce the number of consumed components and thus advantageously reducing the number of manufacturing processes.

The invention claimed is:

1. A hinge structure comprising:
    a fixed plate having two side planes facing each other;
    pivotal plates provided outside both side planes of said fixed plate for relatively pivoting in respect to said fixed plate;
    a hinge shaft inserted into said fixed plate and said pivotal plates for functioning as a central pivoting shaft and provided in one end with a head portion expanded beyond the diameter of said hinge shaft and in the other end with a coupling portion;
    a fixing member fitted around the other end of said hinge shaft and laterally movable for adjusting the degree of tightness between the fixed plate and the pivotal plates; and
    projected washers each integrally bulged from the inner face of said pivotal plates for forming a frictional face against said fixed plate.

2. The hinge shaft according to claim 1, wherein said hinge shaft is a bolt and said fixing member is a nut.

3. The hinge shaft according to claim 1, wherein oil is dropped for allowing contact faces of said projected washers to smoothly move.

4. The hinge shaft according to claim 1, wherein said hinge shaft is a bolt and said fixing member is a nut, and wherein washers are provided in a contact face between said head portion of the bolt and one of said pivotal plates and/or in a contact face between said nut and the other one of said pivotal plates for reducing friction and abrasion.

5. The hinge shaft according to claim 1, further comprising:
    fitting protrusions extended from both lateral portions of said fixed plate; and arc-shaped protrusion-receiving grooves respectively provided in said pivotal plates,
    whereby said fitting protrusion and protrusion-receiving grooves restrict the pivoting angle of said pivotal plates.

6. A hinge structure comprising:
    a fixed plate having two side planes facing each other;
    pivotal plates provided outside both side planes of said fixed plate for relatively pivoting in respect to said fixed plate;
    a hinge shaft inserted into said fixed plate and said pivotal plates for functioning as a central pivoting shaft;
    a fixing member fitted around one end of said hinge shaft for adjusting the degree of tightness between the fixed plate and the pivotal plates;
    a spacer provided between said both side planes of the fixed plate for insertionally receiving said hinge shaft;
    sliding members respectively interposed between both ends of said spacer and inner faces in said both side planes of the fixed plate for equally dividing frictional force; and
    projected washers each integrally bulged from the inner face of said pivotal plates for forming a frictional face against said fixed plate.

7. The hinge structure according to claim 6, wherein each of said sliding members includes:
- a sliding face provided in one end of said each sliding member and contacting with one of inner faces of said fixed plate for uniformly providing frictional force; and
- a spacer-supporting portion provided in the other end of said each sliding member and inserted into said spacer for fixing the position of said spacer.

8. The hinge shaft according to claim 6, further comprising elastic members provided outside said spacer with both ends respectively caught by said fixed plate and said pivotal plates for applying a certain amount of restoring force to said fixed plate.

9. A hinge structure comprising:
- a fixed plate having two side planes facing each other;
- pivotal plates provided outside both side planes of said fixed plate for relatively pivoting in respect to said fixed plate;
- a hinge shaft inserted into said fixed plate and said pivotal plates for functioning as a central pivoting shaft and provided in one end with a head portion expanded beyond the diameter of said hinge shaft and in the other end with a coupling portion;
- a fixing member fitted around one end of said hinge shaft for adjusting the degree of tightness between the fixed plate and the pivotal plates;
- a spacer provided between said both side planes of the fixed plate for insertionally receiving said hinge shaft;
- sliding members respectively interposed between both ends of said spacer and inner faces in said both side planes of the fixed plate for equally dividing frictional force;
- fitting protrusions extended from both lateral portions of said fixed plate; and
- arc-shaped protrusion-receiving grooves respectively provided in said pivotal plates,
- whereby said fitting protrusion and protrusion-receiving grooves restrict the pivoting angle of said pivotal plates.

10. The hinge shaft according to claim 9, wherein said hinge shaft is a bolt and said fixing member is a nut.

11. The hinge shaft according to claim 9, wherein said hinge shaft is a bolt and said fixing member is a nut, and wherein washers are provided in a contact face between said head portion of the bolt and one of said pivotal plates and/or in a contact face between said nut and the other one of said pivotal plates for reducing friction and abrasion.

12. The hinge shaft according to claim 9, wherein each of said sliding members includes:
- a sliding face provided in one end of said each sliding member and contacting with one of inner faces of said fixed plate for uniformly providing frictional force; and
- a spacer-supporting portion provided in the other end of said each sliding member and inserted into said spacer for fixing the position of said spacer.

13. The hinge shaft according to claim 9, further comprising elastic members provided outside said spacer with both ends respectively caught by said fixed plate and said pivotal plates for applying a certain amount of restoring force to said fixed plate.

14. A hinge structure comprising:
- a fixed plate having two side planes facing each other;
- pivotal plates provided outside both side planes of said fixed plate for relatively pivoting in respect to said fixed plate;
- a hinge shaft inserted into said fixed plate and said pivotal plates for functioning as a central pivoting shaft;
- projected washers each integrally bulged from the inner face of said pivotal plates for forming a frictional face against said fixed plate;
- a spacer provided between said both side planes of the fixed plate for insertionally receiving said hinge shaft; and
- sliding members respectively interposed between both ends of said spacer and inner faces in said both side planes of the fixed plate for equally dividing frictional force.

15. The hinge shaft according to claim 14, wherein oil is dropped on contact faces of said projected washers.

16. The hinge shaft according to claim 14, further comprising:
- fitting protrusions extended from both lateral portions of said fixed plate; and
- arc-shaped protrusion-receiving grooves respectively provided in said pivotal plates,
- whereby said fitting protrusion and protrusion-receiving grooves restrict the pivoting angle of said pivotal plates.

17. The hinge shaft according to claim 14, wherein each of said sliding members includes:
- a sliding face provided in one end of said each sliding member and contacting with one of inner faces of said fixed plate for uniformly providing frictional force; and
- a spacer-supporting portion provided in the other end of said each sliding member and inserted into said spacer for fixing the position of said spacer.

18. The hinge shaft according to claim 14, further comprising elastic members provided outside said spacer with both ends respectively caught by said fixed plate and said pivotal plates for applying a certain amount of restoring force to said fixed plate.

* * * * *